United States Patent [19]

Cutshall

[11] Patent Number: 5,658,383
[45] Date of Patent: Aug. 19, 1997

[54] LIQUID COATING APPARATUS

[76] Inventor: Taylor K. Cutshall, 10026 Holly Springs Dr., Houston, Tex. 77042

[21] Appl. No.: 442,305

[22] Filed: May 16, 1995

[51] Int. Cl.⁶ .............................. B05C 11/06; B05B 13/02
[52] U.S. Cl. ............................. 118/64; 118/315; 118/324
[58] Field of Search ........................ 118/58, 64, 65, 118/68, 303, 313, 314, 315, 316, 324; 454/50, 52, 53, 55; 55/DIG. 46, 220, 426, 462–465

[56] References Cited

U.S. PATENT DOCUMENTS

| | | | |
|---|---|---|---|
| 3,084,662 | 4/1963 | Badger | 118/50 |
| 3,424,129 | 1/1969 | Peeps et al. | 118/314 |
| 3,745,971 | 7/1973 | Story | 118/50 |
| 4,333,417 | 6/1982 | Camp et al. | 118/50 |
| 4,538,542 | 9/1985 | Kennon et al. | 118/302 |
| 4,616,594 | 10/1986 | Itho | 454/52 |
| 4,823,728 | 4/1989 | Sturdivant | 118/50 |
| 4,869,935 | 9/1989 | Hayashi et al. | 118/315 |
| 5,173,118 | 12/1992 | Josefsson | 454/52 |
| 5,453,302 | 9/1995 | Chaudhry et al. | 427/430.1 |

FOREIGN PATENT DOCUMENTS 2145442  3/1985  United Kingdom.

*Primary Examiner*—Donald E. Czaja
*Assistant Examiner*—Calvin Padgett
*Attorney, Agent, or Firm*—Browning Bushman

[57] ABSTRACT

Apparatus for applying a liquid coating to an irregularly shaped workpiece comprises a housing defining a coating chamber having an inlet and an exit. A conveyor system is adapted to convey the workpiece into the inlet, through the coating chamber, and out the exit. A plurality of sprayheads are mounted in the coating chamber, in generally surrounding relation to the workpiece, and arranged at various angles with respect to the workpiece, for spraying the liquid coating toward the workpiece. A plenum structure is connected to the housing and defines a plenum chamber communicating with the coating chamber. A vacuum system is associated with the plenum chamber for drawing a vacuum thereon. A blower system adjacent the exit of the coating chamber blows air into the coating chamber toward the workpiece.

15 Claims, 3 Drawing Sheets

LIQUID COATING APPARATUS

BACKGROUND OF THE INVENTION

The present invention comprises an apparatus for applying a liquid coating to a workpiece, particularly an irregularly shaped workpiece. Although the apparatus could be used to apply many different types of coatings, e.g. paints, rust resistant coatings, oils, etc., it is particularly useful where the coating is something such as paint. While the apparatus could apply such a coating to any irregularly shaped workpiece, it is particularly useful for applying such coatings to elongate workpieces, and even more specifically, to workpieces such as joists or trusses or other elongated structural members, which are comprised of a number of interconnected components such as struts and beams, with open spaces therebetween. With such structures, it is difficult to completely coat all sides of the numerous components which make up the elongate members, and particularly to ensure that the coating gets into all the crevices, recesses and the like formed in and between those components, in a quick, preferably automated, operation.

Dip tanks might appear to be an obvious way of painting such complex, irregular structures. However, they are undesirable because more environmentally friendly, water-based paints do not work well in dip-type applications, and thus organic-based paints must be used. Organic-based paints, especially in dip tanks having openings large enough to introduce a workpiece such as a joist or truss, pose an environmental problem, since undesirably large volumes of hazardous organics can evaporate into the surrounding environment. Accordingly, workers must wear protective clothing, and the area must be ventilated. Even then, undesirable amounts of organic vapors are often released into the atmosphere. Additionally, dipped type structures tend to leave paint drippings in the surrounding locations to the dip tanks, on trucks being loaded with the workpieces, etc.

SUMMARY OF THE INVENTION

Apparatus according to the present invention for applying a liquid coating to a workpiece, particularly an irregularly shaped workpiece, comprises a housing defining a coating chamber having an inlet and an exit. A conveyor system or the like conveys the workpiece into the inlet, through the coating chamber, and out the exit. A manifold comprising a plurality of sprayheads are mounted in the coating chamber, in generally surrounding relationship to the workpiece. These spray heads are preferably arranged at various angles with respect to the workpiece for spraying the liquid coating toward the workpiece from a number of different directions. This is one of the features of the invention which helps to ensure that all sides and crevices of the components of the irregularly shaped workpiece are coated.

A plenum structure is connected to the housing and defines a plenum chamber communicating with the coating chamber. A vacuum system, usually associated with the plenum chamber, draws a vacuum thereon and on the coating chamber. This vacuum not only further helps to ensure dispersion of the coating around the various sides of the parts of the workpiece, but also prevents the coating from flowing freely out into the working environment through the inlet and exit of the coating chamber.

A means, e.g. a blower system, adjacent the exit of the coating chamber blows pressurized gas, e.g. air, into the coating chamber toward the workpiece. This helps to remove excess coating from the workpiece as it exits the coating chamber and creates a turbulence in the coating chamber which further helps to ensure coating of all sides of the components of the workpiece.

The blower system also helps to ensure such complete coating in another way, again most especially when combined with the vacuum. Specifically, when high pressure air is blown against one side of a component of the workpiece, e.g. a strut of a truss, a low pressure area is created on the opposite side, so that the coating is literally sucked around the component into the low pressure area e.g., from the one side to the other.

In preferred embodiments, the coating is delivered by suitable piping or the like from the discharge end of a respective pump, collected through a drain in the coating chamber, and delivered back to a closed chamber communicating with the intake of that pump. This helps to minimize the volume of coating potentially exposed to the working environment at any given time, and thus to minimize harmful emissions.

Furthermore, baffle-like structures associated with the plenum chamber tend to minimize the amount of coating which will eventually reach the vacuum pump, and thus be discharged to the atmosphere.

Various objects, features, and advantages of the invention will be made apparent by the following detailed description, the drawings, and the claims.

DETAILED DESCRIPTION

Figure 1:
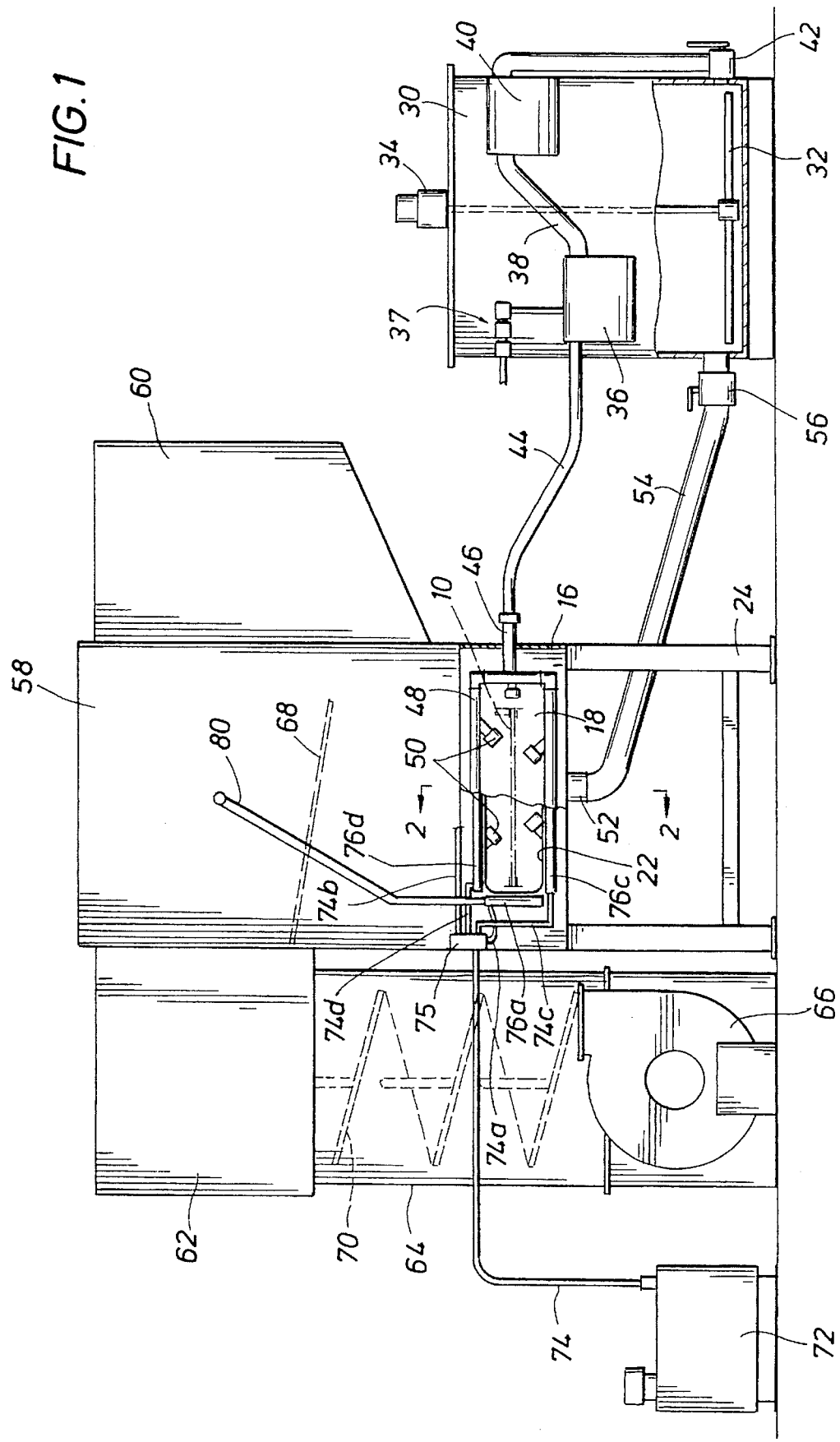
FIG. 1 is an elevational view of an apparatus according to the present invention, viewed from the exit end of the coating chamber, with certain parts broken away to show interior structure.
Figure 2:
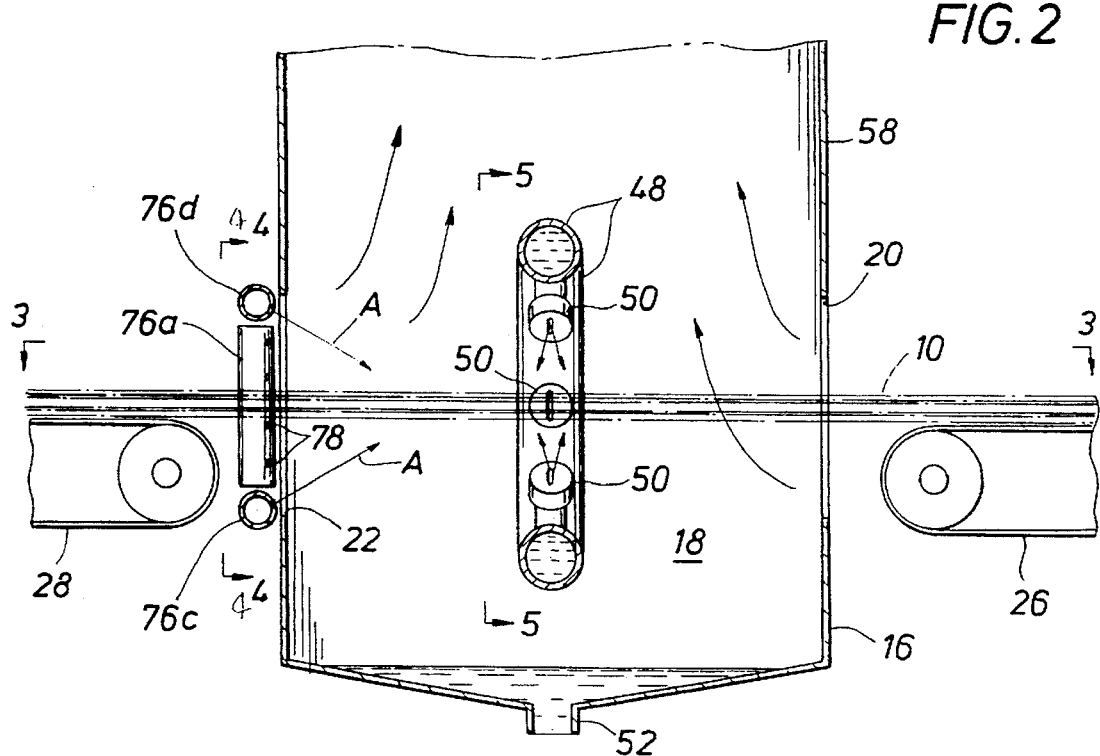
FIG. 2 is an enlarged, detailed cross-sectional view taken on the line 2—2 of FIG. 1.
Figure 3:
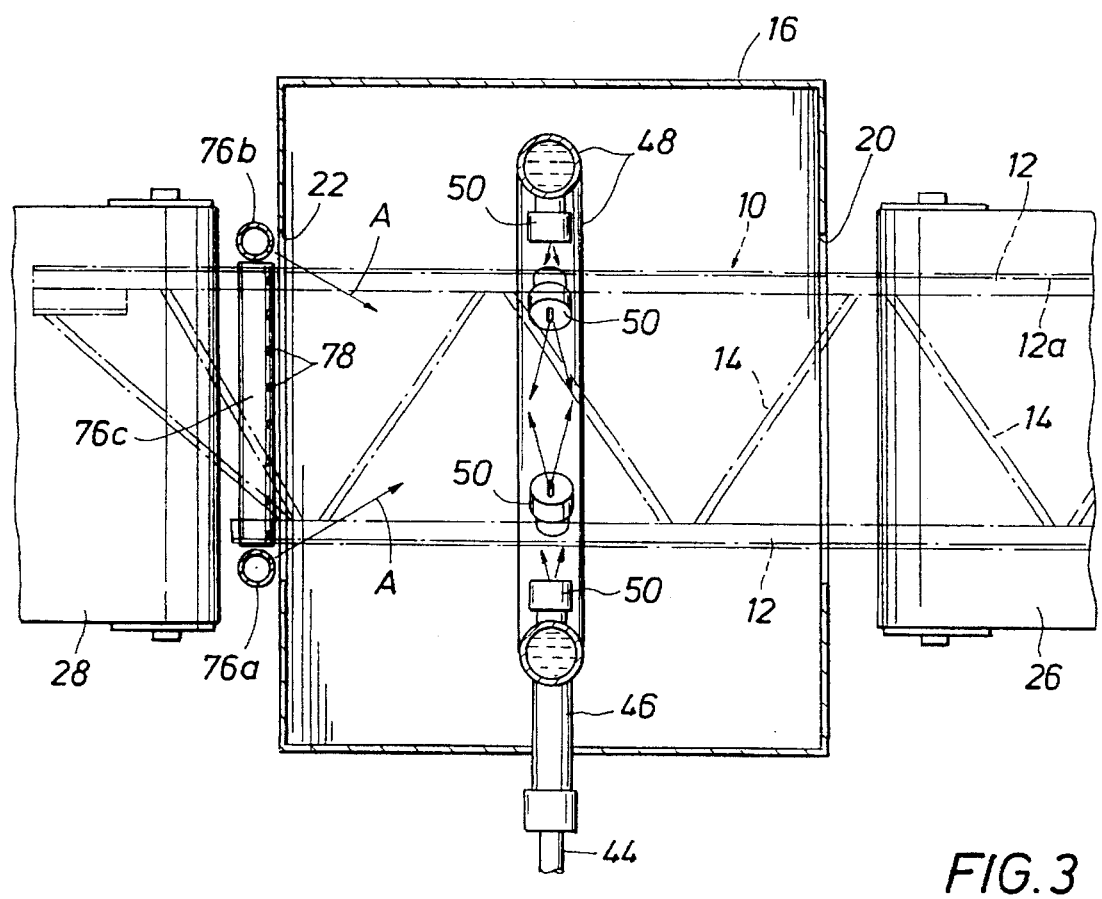
FIG. 3 is a view taken on the line 3—3 of FIG. 2.
Figure 4:
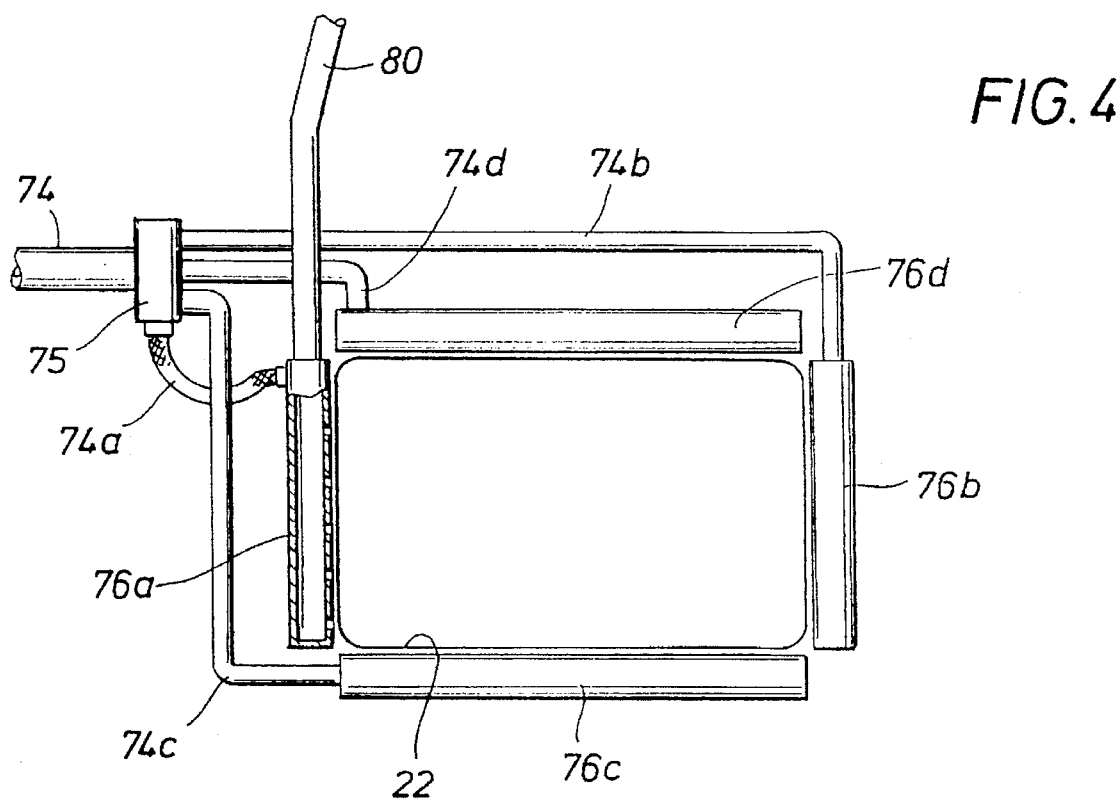
FIG. 4 is a view taken along the line 4—4 of FIG. 2.
Figure 5:
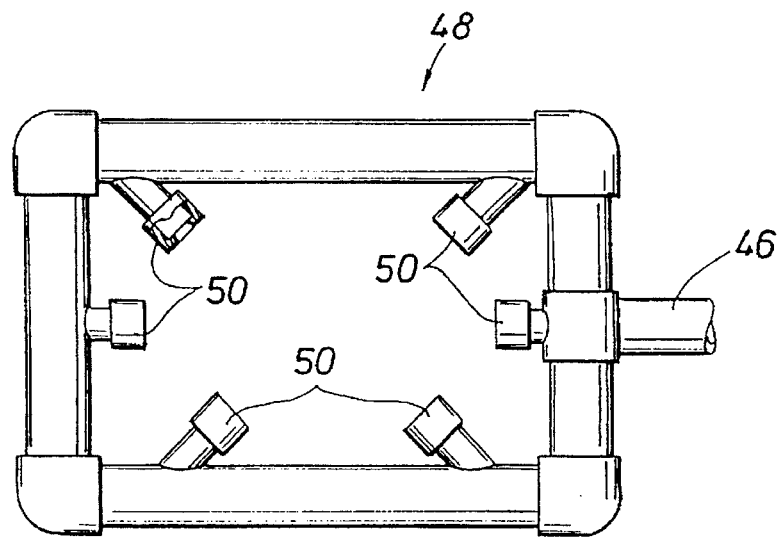
FIG. 5 is a view taken along the line 5—5 of FIG. 2.

Referring now to the drawings, there is shown an apparatus according to the present invention for applying paint to elongate joists, such as that indicated in phantom at 10. The exemplary joist 10 includes a pair of parallel angle irons 12 interconnected by angularly disposed struts 14. To fully coat the joist 10 with paint, the paint must be applied to all sides of each of the angle irons 12 and struts 14, including the surfaces of such defining, for example, the crevices between the angle irons 12 and between the juncture of the angle irons 12 and struts 14.

The apparatus for so applying the paint includes a rectangular housing 16 defining a coating chamber 18 and having a generally rectangular inlet 20 and an aligned exit 22 in respective opposite walls of the housing 16. The housing 16 is supported on the floor of the work area by a base structure 24.

Preferably, the conveyor system of the apparatus includes two point contact slat-type conveyors: an inlet conveyor 26, whose upper surface is aligned with housing inlet 20, and an exit conveyor 28, whose upper surface is aligned with exit opening 22. Because the distance between the opposed ends of the conveyors 26 and 28, and therefore the distance between the openings 20 and 22, is less than the length of the workpiece 10 to be treated, and because the workpiece 10 is rigid, the workpiece 10 need not be directly contacted or supported within the chamber 18. Thus, all surfaces of the section of the workpiece 10 within the chamber 18 are exposed for potential coating by paint, in a manner to be described more fully below.

The paint to be applied to the workpiece 10 is contained in a reservoir or tank 30 located near the housing 16. A stirrer 32 may be provided within the reservoir or tank 30 and rotated by a motor 34. A paint pump 36 e.g. an air operated diaphragm pump, is mounted on or near the tank 30. Standard air processing equipment, i.e. a filter-regulator-lubricator assemblage 37, is associated with pump 30. A line 38 is connected to the intake side of pump 36, passing through a filter 40 and a valve 42 and communicating thence with the bottom of tank 30.

The discharge side of pump 36 discharges into another line 44 connected to a pipe 46 which passes through a wall of housing 16 and communicates with a rectangular circuit of piping 48. The shape of the rectangle defined by circuit 48 is similar to and aligned with, but slightly larger than, those of the inlet and exit 20 and 22. Thus, the circuit 48 surrounds the workpiece 10, and the workpiece 10, in turn, passes through the rectangle defined by circuit 48 as it is conveyed through the coating chamber 18.

Circuit 48 carries and communicates with a plurality of sprayheads 50, all of which are directed generally inwardly, i.e. toward the locus of the workpiece 10, but preferably at various angles, so as to spray paint toward the workpiece 10 from a number of different directions.

Housing 16 has a drain 52 in the bottom thereof which is connected via a line 54 and a valve 56 with the bottom of tank 30. Thus, the paint is recycled in a nearly closed circuit, and is exposed to the atmosphere only in small amounts, i.e. only such amounts as are present in the coating chamber 18, at any given time.

The varying angles of the sprayheads 50 help to ensure coating of all surfaces of workpiece 10, and the nearly closed circuit in which the paint is recycled helps to minimize the emission of potentially hazardous materials to the working environment. Both of these ends are further enhanced by another sub system of the apparatus.

Specifically, a plenum structure is "connected to" the housing 16 (which, for present purposes, may be construed to include structures in which the housing and plenum structure form one continuous body). The plenum structure defines a plenum chamber communicating with the coating chamber 18. In the embodiment shown, the plenum structure comprises several sections. A central section 58 extends directly upwardly from the top of the housing 16. This section 58 is the part of the plenum structure which directly communicates with the coating chamber 18, and it so communicates with and extends from that chamber 18 in a direction transverse to the path of movement of the workpiece 10.

The plenum structure further comprises a blind lateral section 60 which extends from section 58 in a lateral direction transverse to both the path of movement of workpiece 10 and the vertical orientation of section 58. Another lateral plenum section 62 extends from the opposite side of section 58 from section 60. Section 62, in turn, communicates with a cylindrical, vertically oriented section 64, the lower end of which, in turn, communicates with the suction side of a vacuum pump 66.

Pump 66 draws a vacuum on the entire plenum chamber defined by the interiors of the hollow sections 58–64 and hence the coating chamber 18, which vacuum, among other things, helps to prevent the coating from escaping directly into the working environment through the inlet 20 and the exit 22.

A baffle 68, which is generally horizontal, but inclined slightly, extends into the portion of the plenum chamber defined by section 58 directly above the coating chamber 18. Thus, coating or gasses therefrom being evacuated by pump 66 are forced to follow a tortuous path upwardly from the coating chamber 18, then to the right (as viewed in FIG. 1) into plenum section 60, then to the left through the upper part of section 58 and through section 62, and finally downwardly through section 64. Baffle 68 also provides a surface on which particles of paint may impinge and fall back down into chamber 18 where they may be collected by the paint recycling system described above. Mounted within plenum section 64 is an auger-shaped structure 70 which provides additional surfaces on which paint may disengage and be separated from the gasses (air) being evacuated, so that there is little, if any, paint in the air which is exhausted to atmosphere by pump 66.

A compressor 72 compresses air and discharges it, e.g. at about 10 psi, into a line 74 which leads toward the exit 22 of the coating chamber 18 and there, via a manifold 75, branches into four lines 74a–74d. Each of these lines 74a–74d communicates with a respective elongate pipe or "air knife" 76a–76d, each of which has a number of openings 78 e.g. slots, holes, etc. spaced along its length. The pipes 76a–76d are disposed just outwardly of the exit 22, and each of the pipes parallels a respective edge of the exit 22, and also overlaps that edge, so that its openings 78 open into the chamber 18. It will thus be seen that the air or other compressed gas flowing through the air knives 76a–76d serve to generate four converging sheet or planes of compressed air blowing across the workpiece. Thus, virtually any surface of the workpiece which faces the exit 22 from virtually any angle will be subjected to the high pressure air flow from one of the sheets or planes of air.

The compressed air thus blown into the chamber 18 at the truss 10 removes excess paint from the truss 10 as it exits chamber 10. The compressed air also creates a turbulence in the coating chamber 18 which further assists in ensuring complete coating of all surfaces of the joist 10, and the vacuum drawn by pump 66 may further augment this. In addition, this compressed air is directed toward the joist 10, as indicated by the arrows A, and, again augmented by the presence of a vacuum, creates low pressure areas on the opposite sides of angle irons 12 and struts 14 from those against which the air is blowing. These low pressure areas tend to literally suck paint thereinto, thereby further ensuring complete coating.

As shown in FIG. 1, one of the tubes 76a (air knife) is movably mounted on an arm 80 pivoted to plenum section 58 so that it can be moved toward or away from the other tubes 76b–d to adjust for different sizes of workpiece. To accommodate this movement, line 74a, as shown, is flexible.

It will thus be seen that the apparatus of the present invention utilizes three methods to ensure complete coating of workpieces, particularly irregularly shaped workpieces such as joists. First of all, the apparatus provides direct application of paint or similar coating from the paint manifold comprised of circuit 48 and associated spray heads 50 onto the surface of the workpiece. Secondly, since the paint or coating is subjected to the turbulent flow of the air knives or compressed air being blown into the chamber across the workpiece, coating of otherwise hard to reach surfaces is enhanced. Lastly, since voids, recesses and the like formed at interconnection of the components of the workpiece on the leeward side of the workpiece are subjected to a low pressure area caused by the impinging air blown into the coating chamber 18 and across the workpiece via the air knives, the surfaces which define those voids, recess etc. are subjected to paint or coating which is literally sucked into the low pressure area. Thus, the apparatus effectively coats all surfaces on the workpiece.

Numerous modifications of the embodiments described above are within the skill of the art and the scope of the invention, the latter being limited only by the claims which follow.

What is claimed is:

1. Apparatus for applying a liquid coating to a workpiece, comprising:

a housing defining a coating chamber having an inlet and an exit;

means to convey the workpiece into the inlet, through the coating chamber, and out the exit;

means mounted in the coating chamber, in generally surrounding relationship to the workpiece, for spraying the liquid coating toward the workpiece;

means for drawing a vacuum on the coating chamber;

a means adjacent the exit of the coating chamber for directing a high pressure air flow into the coating chamber against the workpiece, said high pressure air flow being sufficient to remove excess coating from said workpiece as it exits said coating chamber and to create turbulence in said coating chamber around said workpiece, said means for directing said high pressure air flow comprising elongate hollow members, each generally parallel to a respective edge of said exit of said coating chamber and each having a plurality of outlets therealong.

2. The apparatus of claim 1 wherein said means for spraying the liquid coating comprises a plurality of spray heads.

3. The apparatus of claim 2 wherein said sprayheads are arranged at various angles with respect to the workpiece.

4. The apparatus of claim 1 including a plenum structure connected to the housing and having a plenum chamber communicating with the coating chamber.

5. The apparatus of claim 4 wherein the plenum chamber communicates with and extends from the coating chamber transverse to the direction of travel of the workpiece.

6. The apparatus of claim 5 wherein at least a portion of the plenum chamber directly communicating with the coating chamber is disposed above the coating chamber.

7. The apparatus of claim 6 further comprising a generally horizontal baffle on the plenum structure extending into the plenum chamber above the coating chamber.

8. The apparatus of claim 7 wherein the means for drawing a vacuum comprises a vacuum pump communicating with the plenum chamber generally on the opposite side of the baffle from the coating chamber.

9. The apparatus of claim 8 further comprising an spiral shaped member in the plenum chamber between the baffle and the vacuum pump.

10. The apparatus of claim 9 wherein the spiral shaped member is arranged generally vertically.

11. The apparatus of claim 2 wherein the spray heads are communicatably connected to a piping circuit generally surrounding the workpiece and having an inlet connected to the discharge end of a coating pump.

12. The apparatus of claim 11 wherein the coating chamber has a drain connected to the intake end of the coating pump.

13. The apparatus of claim 1 wherein one of the elongate members is moveable with respect to the others to adjust for different sizes of workpiece.

14. The apparatus of claim 1 wherein said exit is generally rectangular and there are four of said hollow members.

15. The apparatus of claim 14 wherein one of said elongate hollow members is movable with respect to the others to adjust for different sizes of workpieces.

* * * * *